(12) United States Patent
Messing et al.

(10) Patent No.: US 11,414,126 B2
(45) Date of Patent: Aug. 16, 2022

(54) SYSTEMS AND METHODS FOR PRODUCTION IN-LINE AUDIBLE NOISE VERIFICATION

(71) Applicant: Steering Solutions IP Holding Corporation, Saginaw, MI (US)

(72) Inventors: Nicholas M. Messing, Freeland, MI (US); David W. Koehler, Linden, MI (US); Neil A. Rumschlag, Caro, MI (US); Robert C. Taub, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 201 days.

(21) Appl. No.: 16/844,358

(22) Filed: Apr. 9, 2020

(65) Prior Publication Data
US 2021/0316781 A1    Oct. 14, 2021

(51) Int. Cl.
*G01M 17/06*    (2006.01)
*B62D 5/04*    (2006.01)
*B62D 1/181*    (2006.01)
*G01L 5/22*    (2006.01)

(52) U.S. Cl.
CPC ........... *B62D 5/0481* (2013.01); *B62D 1/181* (2013.01); *G01L 5/221* (2013.01)

(58) Field of Classification Search
CPC ....... B62D 5/0481; B62D 1/181; G01L 5/221; G01M 17/06
See application file for complete search history.

(56) References Cited

U.S. PATENT DOCUMENTS

| | | | | |
|---|---|---|---|---|
| 5,178,411 A * | 1/1993 | Fevre | ..................... | B62D 1/181 280/775 |
| 5,700,951 A * | 12/1997 | Sagiyama | ............. | G01M 17/06 73/11.08 |
| 7,159,904 B2 * | 1/2007 | Schafer | .................. | B62D 1/181 280/775 |
| 9,452,776 B1 * | 9/2016 | Hwa | ..................... | B62D 5/0481 |
| 9,574,972 B2 * | 2/2017 | Oblizajek | ............ | B62D 5/0481 |
| 10,024,745 B1 * | 7/2018 | Luo | ........................ | G01M 17/06 |
| 2004/0032121 A1 * | 2/2004 | Schafer | .................. | B62D 1/181 280/775 |

(Continued)

FOREIGN PATENT DOCUMENTS

| CN | 103207072 A | * | 7/2013 | ............ | G01M 17/06 |
|---|---|---|---|---|---|
| CN | 209085959 U | * | 7/2019 | ............ | G01M 17/06 |

(Continued)

*Primary Examiner* — Freddie Kirkland, III
(74) *Attorney, Agent, or Firm* — Dickinson Wright PLLC

(57) ABSTRACT

A method for detecting steering column defects. The method includes applying a voltage to a steering column mounted on a steering column stand, to cause the steering column to perform an adjustment operation. The method also includes receiving, from at least one force sensor, a plurality of force measurements during performance of the adjustment operation. The method also includes determining whether the steering column is operating within predetermined parameters based on the plurality of force measurements. The method also includes, in response to a determination that the steering column is not operating within the predetermined parameters, identifying the steering column as including at least one defect.

20 Claims, 4 Drawing Sheets

(56) References Cited

U.S. PATENT DOCUMENTS

| | | | | |
|---|---|---|---|---|
| 2007/0089534 A1* | 4/2007 | Chang | ................. | G01M 13/027 |
| | | | | 73/862.08 |
| 2016/0362130 A1* | 12/2016 | Hwa | .................... | B62D 5/0421 |
| 2016/0362131 A1* | 12/2016 | Hwa | .................... | B62D 5/0457 |
| 2017/0166242 A1* | 6/2017 | Konieczny | ............. | B62D 6/002 |
| 2018/0202880 A1* | 7/2018 | Luo | ..................... | G01M 17/007 |
| 2019/0308662 A1* | 10/2019 | Christiansen | ............ | B62D 1/10 |

FOREIGN PATENT DOCUMENTS

| | | | | |
|---|---|---|---|---|
| CN | 111751126 A | * | 10/2020 | ............ G01M 17/06 |
| CN | 110375999 B | * | 6/2021 | ............ G01M 17/06 |

* cited by examiner

SYSTEMS AND METHODS FOR PRODUCTION IN-LINE AUDIBLE NOISE VERIFICATION

TECHNICAL FIELD

This disclosure relates to steering columns and in particular to production in-line audible noise verification of steering columns.

BACKGROUND OF THE INVENTION

Vehicles, such as cars, trucks, sport utility vehicles, crossovers, mini-vans, or other suitable vehicles, include a steering column and a hand wheel (e.g., or steering wheel) that an operator uses to control the steering of a vehicle. Increasingly, such vehicles are being provided with power adjustable steering columns. For example, a vehicle may include a steering column that is adjustable in a direction toward the operator, in a direction away from the operator, and/or in any suitable direction. Such adjustable steering columns may allow an operator to adjust the steering column to easier access to the steering wheel while operating the vehicle.

Further, the vehicle may include autonomous operating features that allow the vehicle to be operated without operator interaction. For example, the vehicle may be configured to autonomously control propulsion, braking, steering, and the like during operation of the vehicle and without operator interaction. Accordingly, such an adjustable steering column may be configured to adjust a position of the steering column to an autonomous operating position (e.g., such that an occupant, such as the operator, in a driver seat of the vehicle is not encumbered by the steering wheel during autonomous operation of the vehicle).

SUMMARY OF THE INVENTION

This disclosure relates generally to power adjustable steering column defect detection.

An aspect of the disclosed embodiments includes a system for detecting steering column defects. The system includes a power adjustable steering column, a steering column running noise stand, a control system with a software program and computing device for operating the system, at least one blocked force sensor, a data acquisition system, test metrics processing software, a test data base, and test metric pass/fail results. The steering column stand is configured to engage the steering column and to simulate installation of the steering column in a vehicle. The blocked force sensor is connected to the steering column running noise stand base and configured to measure dynamic forces generated by the steering column while the system is translated during an adjustment operation. The control system includes instructions that, when executed by the software program, cause the system to: apply a voltage to the steering column to cause the steering column to perform the adjustment operation; collect blocked force measurements during the performance of the adjustment operation; determine whether the steering column is operating within predetermined limits based on the test metrics developed to meet customer expectations; and in response to a determination that the steering column is not operating within the predetermined limits, identify the steering column defect(s).

Another aspect of the disclosed embodiments includes a method for detecting steering column defects. The method includes applying a voltage to a steering column mounted on a steering column stand, to cause the steering column to perform an adjustment operation. The method also includes the collection of blocked force measurements during performance of the adjustment operation. The method also includes determining whether the steering column is operating within predetermined limits based on the blocked force metrics. The method also includes, in response to a determination that the steering column is not operating within the predetermined limits, identifying the steering column defect(s).

Another aspect of the disclosed embodiments includes apparatus for detecting steering column defects. The apparatus includes a control system consisting of a processor (computer) and a memory (software program). The memory includes instructions that, when executed by the processor, cause the processor to: apply a voltage to a steering column mounted on a steering column stand, to cause the steering column to perform an adjustment operation; collect blocked force measurements during performance of the adjustment operation; determine whether the steering column is operating within predetermined limits based on test metrics; and in response to a determination that the steering column is not operating within the predetermined limits, identify & the defect(s) in the steering column.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
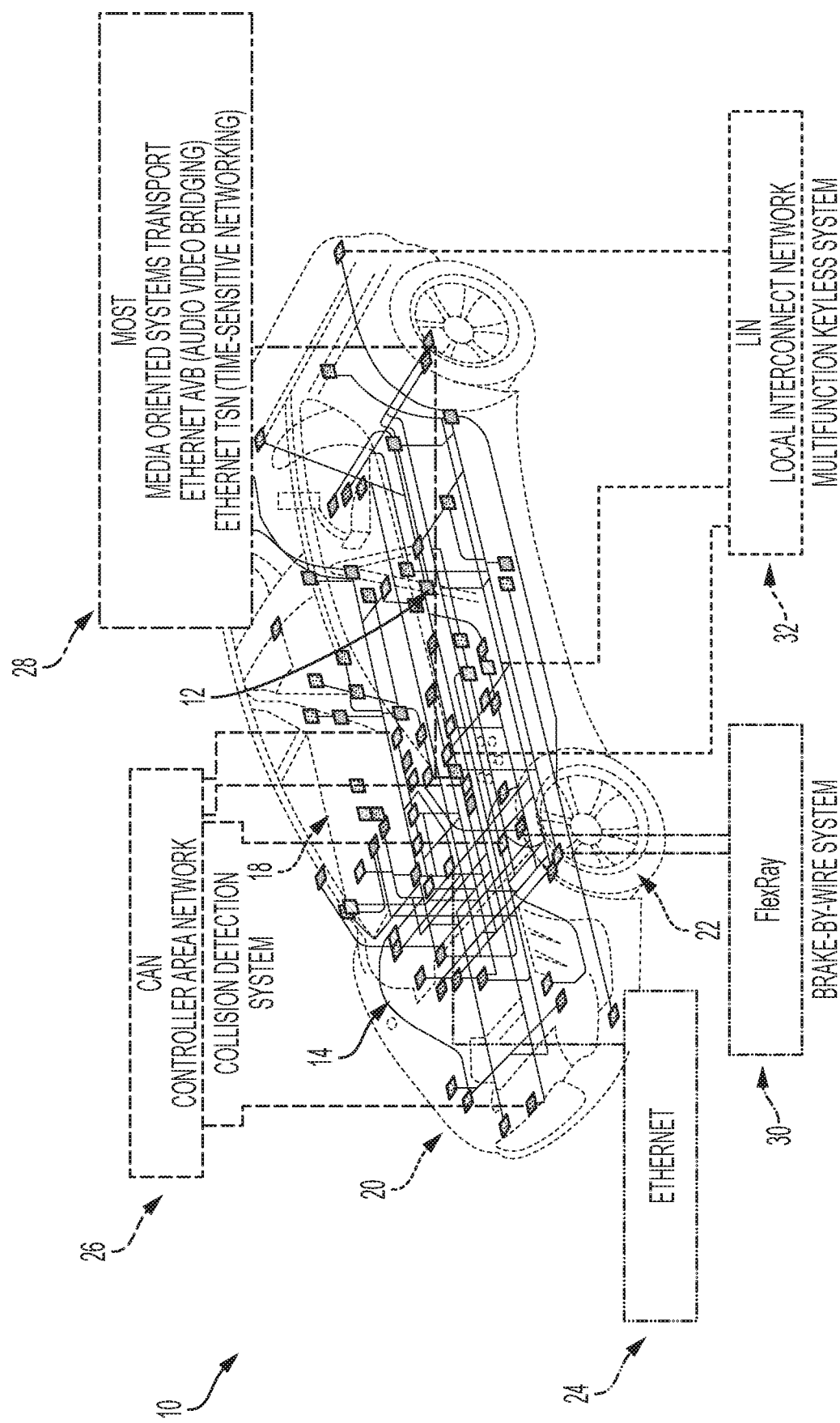
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Vehicles, such as cars, trucks, sport utility vehicles, crossovers, mini-vans, or other suitable vehicles, include steering columns having a steering mechanism, such as a hand wheel (e.g., or steering wheel) that an operator of such engage in order to control steering of a vehicle. Increasingly, such vehicles are being provided with adjustable steering columns. For example, a vehicle may include a steering column that is adjustable in a direction toward the operator, in a direction away from the operator, and/or in any suitable direction. Such adjustable steering columns may allow an operator to adjust the steering column to easier access to the steering wheel while operating the vehicle.

Further, the vehicle may include autonomous operating features that allow the vehicle to be operated without operator interaction. For example, the vehicle may be configured to autonomously control propulsion, braking, steering, and the like during operation of the vehicle and without operator interaction. Accordingly, such an adjustable steering column may be configured to adjust a position of the steering column to an autonomous operating position (e.g., such that an occupant, such as the operator, in a driver seat of the vehicle is not encumbered by the steering wheel during autonomous operation of the vehicle).

The adjustable steering column may include a powered adjustable steering column. For example, the adjustable steering column may receive power from a power supply that may cause an electromechanical actuator to actuate causing the steering column to move between one of a plurality of positions to another of a plurality of positions. Such powered adjustable steering columns may generate one or more audible noises during operation, which may be perceived by an operator or an occupant of the vehicle as a defect in the adjustable steering column. Accordingly, prior to the adjustable steering column being mounted in the vehicle for use by the operator, the adjustable steering column may be analyzed in a production environment (e.g., at an end-of-line of production of the adjustable steering column or other suitable location in the production environment) to detect defects that correspond to such audible noises.

Typically, such defect detection may be based on a correlation of metrics to a customer specification. For example, a production line worker may listen to the adjustable steering columns, individually, during performance of an adjustment operation for a subjective evaluation (e.g., identifying audible noises by listening to each adjustable steering column move between positions). Additionally, or alternatively, an accelerometer may be attached to various components of each respective adjustable steering column (e.g., during a testing phase in the production environment). The accelerometer may provide vibrational data that corresponds to a known audible noise metric. However, such techniques may not identify all audible noises or defects in respective adjustable steering columns and may result in warranty (e.g., acceptance of objectionable steering columns) and high reject rates (e.g., failure of acceptable steering columns).

Accordingly, systems and methods, such as those described herein, configured to detect defects in adjustable steering columns, may be desirable. The systems and methods described herein may be configured to use force sensors (e.g., also referred to as force gages) to monitor forces being exerted by a respective adjustable steering column during motions through a steering column stand. The systems and methods described herein may be configured to use the force sensors to identify amplified results. The systems and methods described herein may be configured to use various filtering techniques to differentiate steering columns having defects from steering columns that are acceptable per the customer specification. The systems and methods described herein may be configured to generate values that are not dependent on a subjective opinion of a production line worker. The systems and methods described herein may be configured to provide a robust and relatively easy to use mechanism for assembly rates required for mass production of such adjustable steering columns.

In some embodiments, the systems and methods described herein may be configured to use a three-component force dynamometer or blocked force sensor assembly to measure dynamic forces generated by the steering column during operation. The systems and methods described herein may be configured to, independent of steering column mounting, measure transmitted forces of steering column at mounting points on the steering column stand corresponding to vehicle mounting points of the steering column. The systems and methods described herein may be configured to use rigid test fixtures to minimized energy loss (e.g., because of fixture compliance). The systems and methods described herein may be configured to provide a steering column running noise test stand having a design that yields frequency range capability of the force measurements (e.g., which may be referred to as block force measurement or NVH structure-borne noise path measurement).

In some embodiments, the systems and methods described herein may be configured to differentiation between the best of the best force measurements and the worst of the worst measurements, using the plurality of force measurements. In some embodiments, the systems and methods described herein may be configured to differentiate between various defects of the steering column using the force measurements. For example, the systems and methods described herein may be configured to identify bent motor shafts, loose clips, insufficient backlash, damaged gears, and the like using the force measurements and a comparison of the force measurements to the predetermined parameters. In some embodiments, the predetermined parameters may include a plurality of metrics corresponding to a customer specification or any other suitable metrics.

In some embodiments, the systems and methods described herein may be configured to using any suitable number of force sensors. For example, the systems and methods described herein may be configured to use a force sensor at every mounting point between the steering column and the steering column stand, which may include four force sensors, or any suitable number of force sensors. The force sensors may include triaxial force sensors, uniaxial force sensors, or any other suitable force sensors. The systems and methods described herein may be configured to provide the force sensors at positions on the steering column based on various applications or testing procedures.

In some embodiments, the systems and methods described herein may be configured to orient the steering column on the steering column stand based on the application or testing procedure. For example, the steering column may be mounted on the steering column stand in a relatively horizontal position, a relatively vertical position, or at any suitable angle to the steering column stand.

In some embodiments, the systems and methods described herein may be configured to use various data processor techniques. The data processing techniques may include: individual X, Y, and Z axis force measurement analysis; a summation of the squares for each axis and/or all of the force sensors used; a summation of each axis and/or all force sensors used; one or more filter applications for particular frequency ranges of the force measurements; one or more filter applications for particular time segments corresponding to the force measurements; any other suitable data processing technique; or a combination thereof.

In some embodiments, the systems and methods described herein may be configured to provide a steering wheel on the steering column while the steering column is mounted to the steering column stand. The systems and methods described herein may be configured to provide a load that simulates a steering wheel on the steering column while the steering column is mounted on the steering column stand. The systems and methods described herein may be configured to apply various voltages to the steering column to cause the steering column to move according to various applications or testing procedures.

In some embodiments, the systems and methods described herein may be configured to detect steering column defects includes applying a voltage to a steering column mounted on a steering column stand, to cause the steering column to perform an adjustment operation. The systems and methods described herein may be configured to receive, from at least one force sensor, a plurality of force measurements during performance of the adjustment operation. The systems and methods described herein may be configured to determine whether the steering column is operating within predetermined parameters based on the plurality of force measurements. The systems and methods described herein may be configured to, in response to a determination that the steering column is not operating within the predetermined parameters, identify the steering column as including at least one defect.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. The vehicle 10 may use the CAN 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
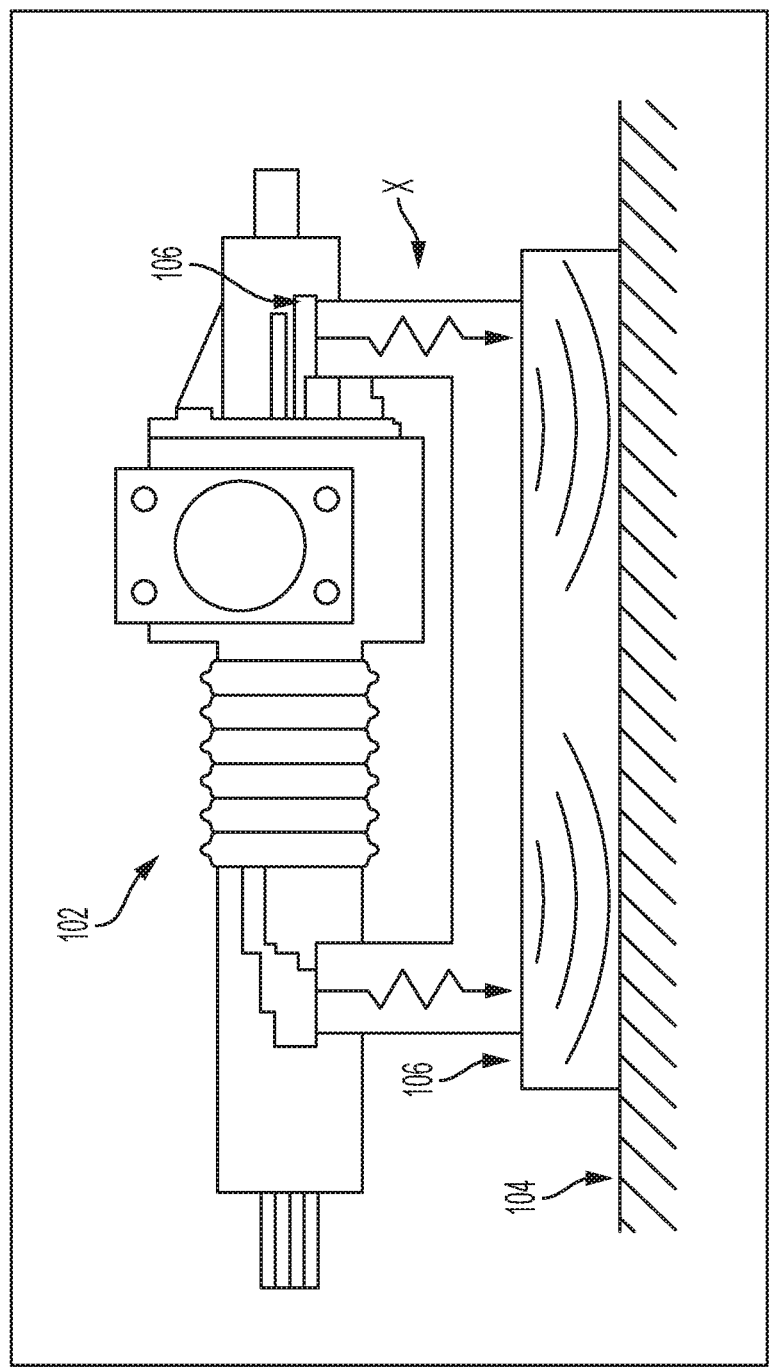
FIG. 2 generally illustrates a steering column and steering column stand according to the principles of the present disclosure.

As described, the vehicle 10 may include a steering wheel (e.g., or hand wheel). The steering wheel may be used by an operator of the vehicle 10 to control steering of the vehicle 10. The steering wheel may be disposed on a steering column, such as the steering column 102 generally illustrated in FIG. 2. The steering column 102 may include an adjustable steering column. For example, the steering column 102 may include a powered adjustable steering column that receives power from a power supply (e.g., such as any suitable power supply) that may cause an electromechanical actuator to actuate causing the steering column to move between one of a plurality of positions to another of a plurality of positions. As described, the steering column 102 may generate one or more audible noises during performance of an adjustment operation, which may be perceived by the operator or an occupant of the vehicle 10 as a defect in the steering column 102.

In to prevent or reduce defects being perceived by the operator during operation of the steering column 102, prior to the steering column 102 being mounted in the vehicle 10, the steering column 102 may be tested or analyzed in a production environment (e.g., at an end-of-line of production of the steering column 102 or other suitable location in the production environment) to detect defects that correspond to the audible noises. The steering column 102 may be mounted to a steering column stand 104. The steering column stand 104 may be configured to engage or receive the steering column 102.

The steering column stand 104 may be configured to simulate mounting the steering column 102 in the vehicle 10 or any other suitable vehicle or mounting application. For example, the steering column 102 may be mounted on the steering column stand 104 in a relatively horizontal position, a relatively vertical position, or at any suitable angle to the steering column stand 104 based on a desired mounting application (e.g., to simulate installation or mounting of the steering column 102 in the vehicle 10 or any other suitable mounting application). The steering column stand 104 may provide a rigid test fixture configured to minimized energy loss during operation of the steering column 102.

In some embodiments, the steering column 102 may include a steering wheel while the steering column 102 is mounted to the steering column stand 104. Alternatively, the steering column 102 may include a load that simulates a steering wheel on the steering column 102 while the steering column 102 is mounted on the steering column stand 104.

In some embodiments, one or more force sensors 106 may be mounted or disposed on or the steering column stand 104. The one or more force sensors 106 may include a blocked force dynamometer, blocked force sensors, other suitable force sensors, or a combination thereof. The one or more force sensors 106 may be disposed between the steering column 102 and the steering column stand 104 at corresponding mounting points between the steering column 102 and the steering column stand 104. In some embodiments, the one or more force sensors 106 may be disposed at any suitable location on the steering column 102, on the steering column stand 104, between the steering column 102 and the steering column stand 104 at any suitable contact point, any other suitable location, or a combination thereof. In some embodiments, the one or more force sensors 106 is connected to the steering column 102 by fixture x at corresponding mounting points. It should be understood that any suitable number of force sensors 106 may be disposed on or near the steering column 102 or the steering column stand 104, such as one force sensor, two force sensors, three force sensors, four force sensors, or any other suitable number of force sensors. The one or more force sensors 106 may include uniaxial force sensors, triaxial force sensors, any other suitable force sensors, or a combination thereof. The one or more force sensors 106 may be configured to measure forces generated or exerted by the steering column 102 during operation of the steering column 102 while the steering column 102 is mounted on the steering column stand 104.

Figure 3:
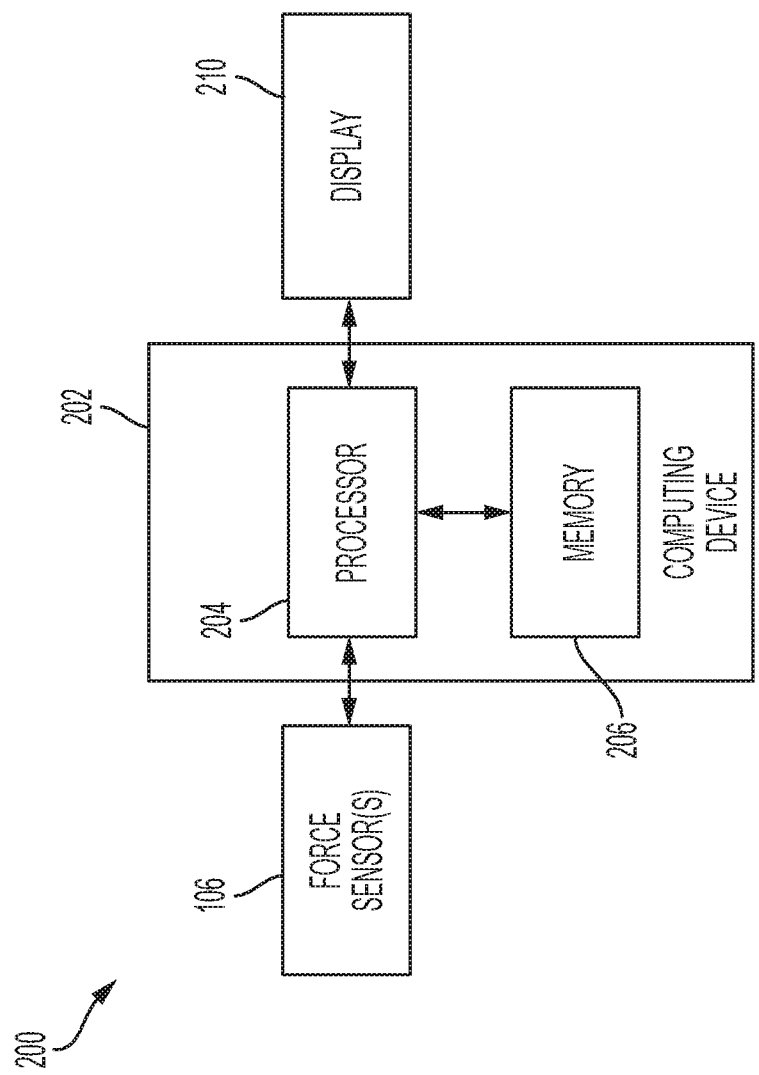
FIG. 3 generally illustrates a steering column defect detection system according to the principles of the present disclosure.

As is generally illustrated in FIG. 3, a steering column defect detection system 200 may be configured to detect defects in the steering column 102. The system 200 includes a computing device 202. The computing device 202 may include any suitable computing device, such as a laptop computing device, a desktop computing device, a tablet computing device, a mobile computing device (e.g., a smart phone or wearing computing device), and the like. The computing device 202 may be located proximate to the steering column 102 while the steering column 102 is mounted on the steering column stand 104 or may be remotely located from the steering column 102 (e.g., such as a remotely located server on a cloud computing system and the like).

The computing device 202 includes a processor 204 and a memory 206. The processor 204 may include any suitable processor, such as those described herein. The memory 206 may comprise a single disk or a plurality of disks (e.g., hard drives), and includes a storage management module that manages one or more partitions within the memory 206. In some embodiments, memory 206 may include flash memory, semiconductor (solid state) memory or the like. The memory 206 may include Random Access Memory (RAM), a Read-Only Memory (ROM), or a combination thereof. The memory 206 may include instructions that, when executed by the processor 204, cause the processor 204 to, at least, detect defects in the steering column 102.

In some embodiments, the computing device 202 is in communication with an electromechanical actuator associated with steering column 102. For example, the computing device 202 may provide a predetermined voltage and/or cause a predetermined amount of voltage to be applied to the electromechanical actuator causing the actuator to actuate. The actuator causes the steering column 102 to perform an adjustment operation. The adjustment operation may include the steering column 102 moving between one of a plurality of positions to another of a plurality of positions. For example, the computing device 202 may apply the predetermined voltage to cause the steering column 102 to move between a first position and a second position. It should be understood that the computing device may use any suitable voltage value determined to cause the steering column 102 to move between any of the plurality of positions.

During performance of the adjustment operation, forces generated by the steering column 102 are measured by the one or more force sensors 206. The one or more force sensors 206 may communicate a plurality force measurements measured during performance of the adjustment operation to the computing device 202. The computing device 202 may be configured to determine whether the steering column 102 is operating within predetermined parameters based on the plurality of force measurements. The predetermined parameters include one or more expected force measurement amplitude frequencies, one or more force measurement thresholds, and the like.

The computing device 202 may be configured to compare the plurality of force measurements to the predetermined parameters. The computing device 202 may determine whether the steering column 102 is operating within the predetermined parameters based on the comparison. For example, the computing device 202 may generate a plurality of test metrics using the plurality of force measurements. The computing device 202 may compare the plurality of test metrics to a predetermined force measurement threshold (e.g., which may be referred to as a predetermined threshold or limit). If the computing device 202 determines that the plurality of test metrics are less than a predetermined force measurement thresh, the computing device 202 determines the steering column 102 is operating within the predetermined parameters (e.g., or limits). It should be understood that the predetermined parameters may include any suitable operating parameter and the computing device 202 may determine whether the steering column 102 is operating within the predetermined parameters based on any suitable comparison and/or outcome of any suitable comparison.

In some embodiments, the systems and methods described herein may be configured to differentiation between the best of the best force measurements and the worst of the worst metrics, using the plurality of force measurements. The computing device 202 may determine whether a number of the best of the best force metrics is greater than a threshold. If the computing device 202 determines that the number of the best of the best force metrics is greater than the threshold, the computing device 202 may determine that the steering column 102 is operating within the predetermined parameters. Conversely, if the computing device 202 determines that the number of the best of the best force metrics is less than the threshold, the computing device 202 may determine that the steering column 102 is not operating within the predetermined parameters.

Similarly, the computing device 202 may determine whether a number of the worst of the worst force metrics is less than a threshold. If the computing device 202 determines that the number of the worst of the worst force metrics is less than the threshold, the computing device 202 may determine that the steering column 102 is operating within the predetermined parameters. Conversely, if the computing device 202 determines that the number of the worst of the worst force metrics is greater than the threshold, the computing device 202 may determine that the steering column 102 is not operating within the predetermined parameters.

In some embodiments, the computing device 202 may differentiate between various defects of the steering column 102. For example, the computing device 202 may be configured to identify bent motor shafts, loose clips, insufficient backlash, damaged gears, and the like using the force measurements and a comparison of the force measurements to the predetermined parameters.

In some embodiments, the computing device 202 may be configured to use various data processor techniques. The data processing techniques may include: individual X, Y, and Z axis force measurement analysis; a summation of the squares for each axis and/or all of the force sensors 106; a summation of each axis and/or all of the force sensors 106; one or more filter applications for particular frequency ranges of the plurality of force measurements; one or more filter applications for particular time segments corresponding to the plurality of force measurements; any other suitable data processing technique; or a combination thereof. In some embodiments, the computing device 202 may be configured use a three-component force dynamometer to measure dynamic forces generated by the steering column 102 during performance of the adjustment operation.

In some embodiments, the computing device 202 may be configured to determine that the steering column 102 includes at least one defect based on a determination that the steering column 102 is not operating within the predetermined parameters. If the computing device 202 determines that the steering column 102 includes at least one defect, the steering column 102 may be repaired or refurbished to correct the at least one defect. The steering column 102 may then be retested, as described.

In some embodiments, the computing device 202 may determine whether a number of detected defects of the steering column 102 is greater than a threshold (e.g., an acceptable number of defects). If the computing device 202 determines that the number of defects is greater than the threshold, the steering column 102 may be repaired or refurbished, as described. If the computing device 202 determines that the number of defects of the steering column 102 is less than the threshold, the steering column 102 may be identified as suitable for use in a vehicle, such as the vehicle 10 and may be installed in the vehicle 10. The computing device 202 may generate an output indicating the detected defects and/or any other suitable information. The computing device 202 may communicate the output to a display 210. The display 210 may include any suitable display. The display 210 may be configured to display the output.

In some embodiments, the system 200 may perform the methods described herein. However, the methods described herein as performed by system 200 are not meant to be limiting, and any type of software executed on a controller can perform the methods described herein without departing from the scope of this disclosure. For example, a controller, such as a processor executing software within a computing device, can perform the methods described herein.

Figure 4:
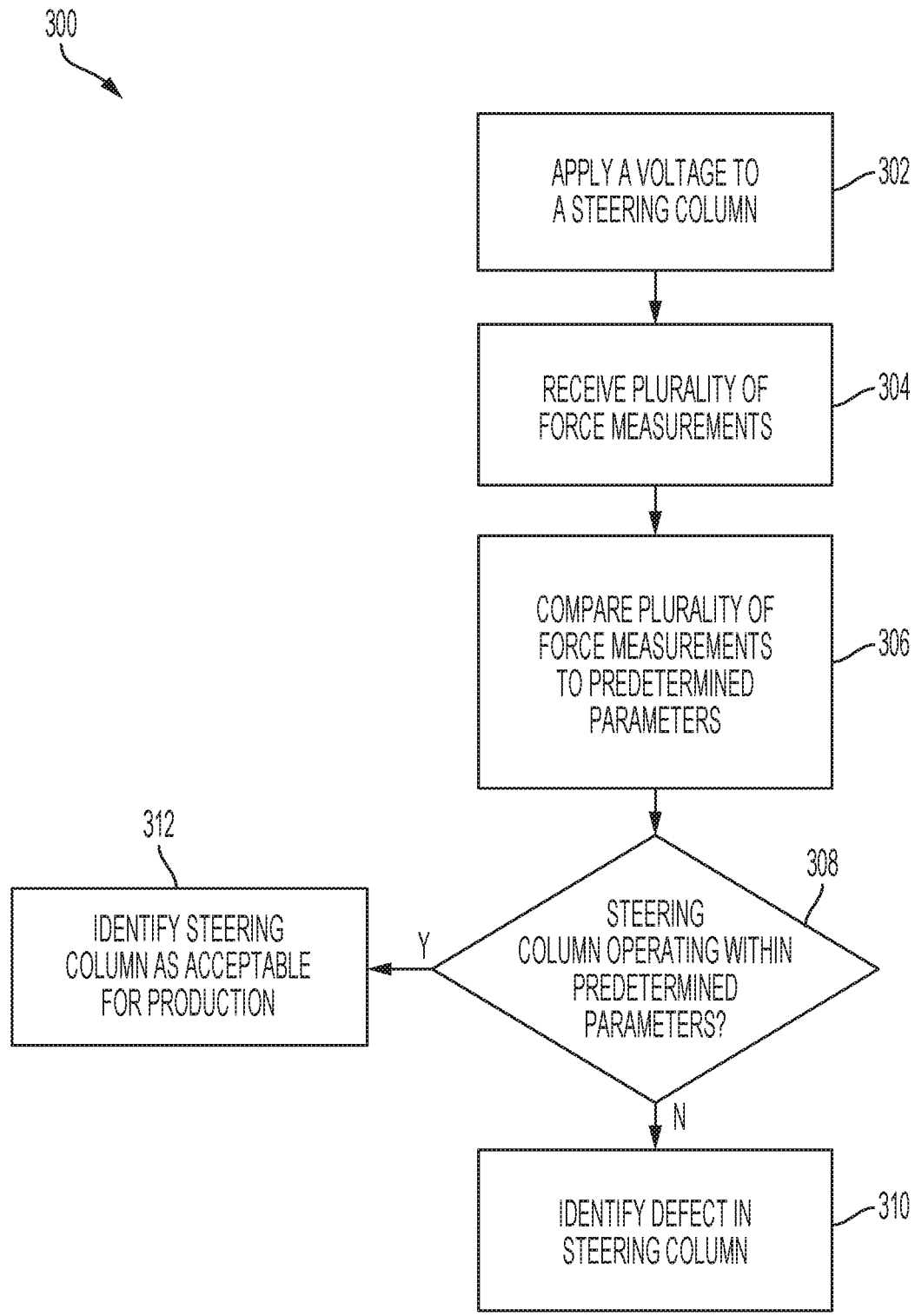
FIG. 4s is a flow diagram generally illustrating a steering column defect detection method according to the principles of the present disclosure.

FIG. 4 is a flow diagram generally illustrating a steering column defect detection method 300 according to the principles of the present disclosure. At 302, the method 300 applies a voltage to a steering column. For example, the computing device 202 applies the predetermine voltage to the steering column 102 while the steering column 102 is mounted on the steering column stand 104. In response to the computing device 202 applying the voltage to the steering column 102, the steering column 102 performs the adjustment operation, as described.

At 304, the method 300 receives a plurality of force measurements. For example, the computing device 202 receives the plurality of force measurements from the one or more force sensors 106.

At 306, the method 300 compares the plurality of force measurements to predetermined parameters. For example, the computing device 202 compares test metrics generated based on the plurality of force measurements to the predetermined parameters.

At 308, the method 300 determines whether the steering column is operating within the predetermined parameters. For example, the computing device 202 determines, based on the comparison of the test metrics to the predetermined parameters, whether the steering column 102 is operating within the predetermined parameters. If the computing device 202 determines that the steering column 102 is operating within the predetermined parameters, the method 300 continues at 312. If the computing device 202 determines that the steering column 102 is not operating within the predetermined parameters, the method 300 continues at 310.

At 310, the method 300 identifies a defect in the steering column. For example, the computing device 202 identifies a defect in the steering column 102. The computing device 202 may identify a specific defect in the steering column 102 and/or the computing device 202 may identify the steering column 102 as defective.

At 312, the method 300 identifies the steering column as acceptable for production. For example, the computing device 202 may identify the steering column 102 is acceptable for production. The computing device 202 may update a database that includes steering column serial numbers that have been identified as being acceptable for production. The steering column 102 may be installed or mounted in a vehicle, such as the vehicle 10 or other suitable vehicle.

In some embodiments, a system for detecting steering column defects includes an adjustable steering column, a steering column stand, at least one force sensor, a processor, and a memory. The steering column stand is configured to engage the steering column and to simulate installation of the steering column in a vehicle. The at least one force sensor is disposed on the steering column stand and configured to measure forces generated by the steering column during an adjustment operation. The memory includes instructions that, when executed by the processor, cause the processor to: apply a voltage to the steering column to cause the steering column to perform the adjustment operation; receive a plurality of force measurements from the at least one force sensor during performance of the adjustment operation; determine whether the steering column is operating within predetermined parameters based on the plurality of force measurements; and in response to a determination that the steering column is not operating within the predetermined parameters, identify the steering column as including at least one defect.

In some embodiments, the at least one force sensor includes a uniaxial force sensor. In some embodiments, the at least one force sensor includes a triaxial force sensor. In some embodiments, the at least one force sensor is disposed at a mounting point between the steering column and the steering column stand. In some embodiments, the system also includes at least one other force sensor, wherein the at least one force sensor and the at least one other force sensor are disposed at corresponding mounting points between the steering column and the steering column stand. In some embodiments, the predetermined parameters include one or more expected force measurement amplitude frequencies. In some embodiments, the predetermined parameters include one or more force measurement thresholds. In some embodiments, the steering column includes a load configured to simulate a hand wheel. In some embodiments, the steering column stand is configured to engage the steering column at an angle corresponding to a vehicle installation angle of the steering column.

In some embodiments, a method for detecting steering column defects includes applying a voltage to a steering column mounted on a steering column stand, to cause the steering column to perform an adjustment operation. The method also includes receiving, from at least one force sensor, a plurality of force measurements during performance of the adjustment operation. The method also includes determining whether the steering column is operating within predetermined parameters based on the plurality of force measurements. The method also includes, in response to a determination that the steering column is not operating within the predetermined parameters, identifying the steering column as including at least one defect.

In some embodiments, the at least one force sensor includes a uniaxial force sensor. In some embodiments, the at least one force sensor includes a triaxial force sensor. In some embodiments, the at least one force sensor is disposed at a mounting point between the steering column and the steering column stand. In some embodiments, the at least one force sensor and at least one other force sensor are disposed at corresponding mounting points between the steering column and the steering column stand. In some embodiments, the predetermined parameters include one or more expected force measurement amplitude frequencies. In some embodiments, the predetermined parameters include one or more force measurement thresholds. In some embodiments, the steering column includes a load configured to simulate a hand wheel. In some embodiments, the steering column stand is configured to engage the steering column at an angle corresponding to a vehicle installation angle of the steering column.

In some embodiments, an apparatus for detecting steering column defects includes a processor and a memory. The memory includes instructions that, when executed by the processor, cause the processor to: apply a voltage to a steering column mounted on a steering column stand, to cause the steering column to perform an adjustment operation; receive, from at least one force sensor, a plurality of force measurements during performance of the adjustment operation; determine whether the steering column is operating within predetermined parameters based on the plurality of force measurements; and in response to a determination that the steering column is not operating within the predetermined parameters, identify a defect in the steering column.

In some embodiments, the steering column stand is configured to engage the steering column at an angle corresponding to a vehicle installation angle of the steering column.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for detecting steering column defects, the system comprising:
   an adjustable steering column;
   a steering column stand configured to engage the steering column and to simulate installation of the steering column in a vehicle;
   at least one force sensor disposed on the steering column stand and configured to measure forces generated by the steering column during an adjustment operation;
   a processor; and
   a memory that includes instructions that, when executed by the processor, cause the processor to:
      apply a voltage to the steering column to cause the steering column to perform the adjustment operation;
      receive a plurality of force measurements from the at least one force sensor during performance of the adjustment operation;
      determine whether the steering column is operating within predetermined parameters based on the plurality of force measurements; and
      in response to a determination that the steering column is not operating within the predetermined parameters, identify the steering column as including at least one defect, wherein the at least one defect corresponds to at least one audible noise.

2. The system of claim 1, wherein the at least one force sensor includes a uniaxial force sensor.

3. The system of claim 1, wherein the at least one force sensor includes a triaxial force sensor.

4. The system of claim 1, wherein the at least one force sensor is disposed at a mounting point between the steering column and the steering column stand.

5. The system of claim 1, further comprising at least one other force sensor, wherein the at least one force sensor and the at least one other force sensor are disposed at corresponding mounting points between the steering column and the steering column stand.

6. The system of claim 1, wherein the predetermined parameters include one or more expected force measurement amplitude frequencies.

7. The system of claim 1, wherein the predetermined parameters include one or more force measurement thresholds.

8. The system of claim 1, wherein the steering column includes a load configured to simulate a hand wheel.

9. The system of claim 1, wherein the steering column stand is configured to engage the steering column at an angle corresponding to a vehicle installation angle of the steering column.

10. A method for detecting steering column defects, the method comprising:
    applying a voltage to a steering column mounted on a steering column stand, to cause the steering column to perform an adjustment operation;
    receiving, from at least one force sensor, a plurality of force measurements during performance of the adjustment operation;
    determining whether the steering column is operating within predetermined parameters based on the plurality of force measurements; and
    in response to a determination that the steering column is not operating within the predetermined parameters, identifying the steering column as including at least one defect, wherein the at least one defect corresponds to at least one audible noise.

11. The method of claim 10, wherein the at least one force sensor includes a uniaxial force sensor.

12. The method of claim 10, wherein the at least one force sensor includes a triaxial force sensor.

13. The method of claim 10, wherein the at least one force sensor is disposed at a mounting point between the steering column and the steering column stand.

14. The method of claim 10, wherein the at least one force sensor and at least one other force sensor are disposed at corresponding mounting points between the steering column and the steering column stand.

15. The method of claim 10, wherein the predetermined parameters include one or more expected force measurement amplitude frequencies.

16. The method of claim 10, wherein the predetermined parameters include one or more force measurement thresholds.

17. The method of claim 10, wherein the steering column includes a load configured to simulate a hand wheel.

18. The method of claim 10, wherein the steering column stand is configured to engage the steering column at an angle corresponding to a vehicle installation angle of the steering column.

19. An apparatus for detecting steering column defects, the apparatus comprising:
    a processor; and
    a memory that includes instructions that, when executed by the processor, cause the processor to:
       apply a voltage to a steering column mounted on a steering column stand, to cause the steering column to perform an adjustment operation;
       receive, from at least one force sensor, a plurality of force measurements during performance of the adjustment operation;
       determine whether the steering column is operating within predetermined parameters based on the plurality of force measurements, wherein the predetermined parameters corresponds to at least one audible noise parameter; and
       in response to a determination that the steering column is not operating within the predetermined parameters, identify a defect in the steering column, wherein the at least one defect corresponds to at least one audible noise.

20. The apparatus of claim 19, wherein the steering column stand is configured to engage the steering column at an angle corresponding to a vehicle installation angle of the steering column.

\* \* \* \* \*